Oct. 15, 1963  MARTIN NETKE  3,107,170
PRODUCTION OF COLOR IMAGES IN SENSITIVE EMULSIONS
Filed May 31, 1960
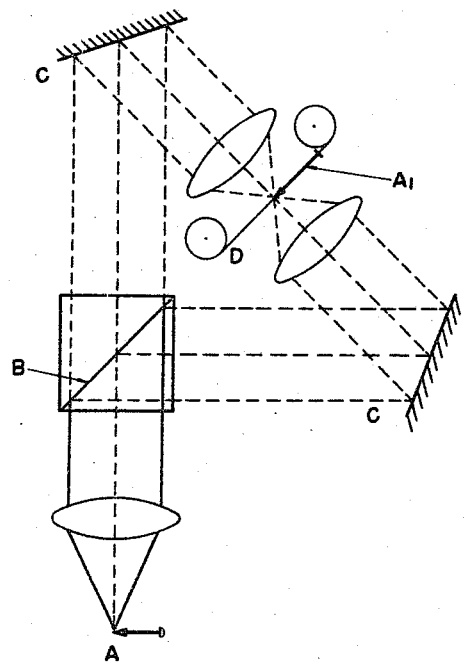
INVENTOR.
MARTIN NETKE
BY
Burgen, Dinklage & Sprung
ATTORNEYS United States Patent Office 3,107,170
Patented Oct. 15, 1963

3,107,170
PRODUCTION OF COLOR IMAGES IN SENSITIVE EMULSIONS
Martin Netke, Minato-ku, Shiba Shirokane Sanko-cho 255, Tokyo, Japan
Filed May 31, 1960, Ser. No. 32,775
5 Claims. (Cl. 96—2)

This invention relates to new and useful improvements in the production of color images in sensitive emulsions and additionally to an apparatus for carrying out the same.

When white light is reflected from a thin film, such as a soap bubble or a layer of oil on water, colored effects are seen. This is due to the optical interference between light reflected from the upper surface and that from the lower. In the same manner, Newton's rings, i.e., colored rings are produced when plane and convex glass surfaces are pressed together. The colored, circular, concentric rings are the result of interference between the beams of light reaching the eye by reflection from the two surfaces on account of the difference in the length of the paths traversed. The interference occurs in the air film enclosed between the two surfaces.

Colored photographs have been produced employing the effects associated with the phenomena of colors of thin films. Thus, Lipman has proposed bringing the sensitive emulsion into close contact with a layer of liquid mercury and thereafter exposing the sensitive layer in a photographic camera to thereby obtain a negative on which a colored image had been registered. In this method the light from the object being photographed was divided into colored light and white light (consisting of all other components of the light beam but the colored light being reflected) and the colored light was reflected by the liquid mercury layer. The incident light wave, together with the reflected light wave, produces the stationary wave in the sensitive emulsion, that is the stationary wave is produced by the optical interference between the two separate waves of light. This stationary wave forms the so-called "Zenker's thin piece" in its crest. After the exposed sensitive emulsion has been developed, the "Zenker's thin pieces" primarily reflect light of substantially similar color to that of the light which formed the "Zenker's thin pieces" on exposure of the sensitive emulsion. Thus, when a sensitive emulsion is exposed to a light of red color and having a certain wave length, the stationary waves produced have "Zenker's thin pieces" positioned a certain distance apart from each other. Only the red light components of the white light corresponding to the red light components which on reflection made up the "Zenker's thin pieces" on exposure are reflected from the developed image so that red only is seen. All of the other components of the white light having penetrated the emulsion at the same place, at the time of the exposure, they are not reflected from this same place of the emulsion by the "Zenker's thin pieces," in the developed image, but pass the "Zenker's thin pieces."

The major disadvantage to the widespread acceptance of the Lipmann method lies in the necessity in connection therewith of using a mirror face (reflecting surface) of liquid mercury. Each sensitive plate supporting member must be constructed in the form of a tank into which the liquid mercury must be introduced before each exposure. Thus, for practical operation, the Lipmann method is wholly unsuitable. It is an important laboratory tool, however, and must remain as such.

Numerous attempts have been made to substitute other materials for the liquid mercury. It has been proposed to position a black plushy material behind the sensitive emulsion or to take advantage of the reflection on the border face between the sensitive emulsion and air but in both these instances, the resulting color is too dark and not at all satisfactory.

It has also been proposed to apply the emulsion as a coating onto a highly polished metal plate which has first been coated with collodion. The sensitive emulsion is, after exposure, transferred to a glass plate. Good color and that over a broad range is produced in the developed photograph. This procedure is both complicated, expensive, and not always successful in that satisfactory color results are not obtained when the sensitive emulsion lies in contact with the metal surface due to the improper coating with collodion, etc.

The suggestion to employ, as a lower surface, a glass silvered to form a mirror and which has been coated with gelatin has been found to suffer from the same disadvantages as the collodion coated metal process.

Instead of liquid mercury or coated metal or glass mirror, it has been proposed to employ a silver foil coated with collodion. The wet sensitive emulsion is applied to the coated silver foil, the foil being removed after exposure but prior to development. This proposal suffers from the disadvantage that the silver sticks to a considerable extent to the sensitive emulsion causing serious difficulties in the subsequent development.

One object of this invention is a method of producing a color image, which may be effected in an extremely simple manner without the above-mentioned disadvantages, which is excellently suited for commercial operation and which allows the production of color images of satisfactory color appearance and spectrum range.

The invention will be more fully understood and further objects and advantages thereof will become apparent when reference is made to the more detailed description which is to follow and to the accompanying drawing in which there is diagrammatically shown an embodiment of an apparatus which may be used to carry out the process of the invention.

In accordance with the invention, it has now been discovered that entirely satisfactory color images can be produced by passing light rays through a bisecting component for splitting light into two separate paths, reflecting said light in each instance, passing the reflected light from each path through a common focal point and maintaining a light-sensitive emulsion across said focal point.

By passing the reflected light from the two paths, through a common focal point across which the light-sensitive panchromatic emulsion is disposed, the phenomenon of interference between the two light waves results producing a stationary wave in the light-sensitive panchromatic emulsion which is subsequently registered in the developed emulsion by reflection caused by the "Zenker's thin pieces," as a colored image.

The bisecting component for splitting the incident light, as for example two combined identical prisms, split the light into two separate and divergent paths forming a right angle, i.e., diverging by 90°. The diverging light paths are reflected by directing the same against a light-reflecting surface, as for example a mirror. The two reflected light paths are then converged from opposite directions through a coincidental focal point by passing each path of reflected light through a convergent or convex lens. Each lens must be capable of converging the divergent light paths to the same degree in order that the beams or paths of light meet at the common focal point from opposite directions.

The light-sensitive transparent panchromatic emulsion is disposed across the common focal point, that is transversely to the direction of the paths of coinciding light beams.

The method of producing a color image in a light-sensitive panchromatic emulsion can be preferably carried out employing a construction for producing interfering light waves which may be applied to opposite sides of the light-sensitive panchromatic emulsion with the object of producing a stationary wave in the light-sensitive panchromatic emulsion. The preferred construction in accordance with the invention comprises a lens, a light-splitting component serving to split the light beam into two diverging paths of light, means for reflecting each of the paths of split light back into one plane and means for converging the split paths of light through a coincidental focal point from opposite directions. The color image reflected by "Zenker's thin pieces" is produced by stationary waves caused by the passage of the converging paths of light through the coincidental focal point across which a thin, transparent film of a light-sensitive panchromatic emulsion is maintained. The light waves passing through from the opposite surfaces of the film result in interference between the two oppositely directed light waves to thereby produce a stationary wave. After proper development of the panchromatic film exposed in said ray, the image is reflected in natural color by the "Zenker's thin pieces." The apparatus preferably includes means for passing the thin light-sensitive panchromatic film through the coincidental focal point.

Referring to the embodiment shown in the drawing, the light beam A is first passed through the forwardly arranged lens, and thence through a light-splitting component, the splitting occurring at plane B. The diverging paths of light are reflected at C by, in this instance, mirrors and each of the reflected paths of light is passed through a converging lens adapted to pass the converging light paths through a common focal point. $A_1$ represents a thin film of sensitive emulsion and D the means for passing such film through the said focal point.

I claim:

1. Method for producing a reflected colored image in a light-sensitive panchromatic emulsion which comprises passing a beam of light through a bisecting component for splitting said light beam into two separate and divergent paths of unfiltered light, reflecting said light paths in each instance, passing the reflected light from each of said paths from opposite directions through a common focal point and maintaining a transparent film of light-sensitive panchromatic emulsion across said focal point to cause stationary rays in said light-sensitive panchromatic emulsion producing after proper development "Zenker's thin pieces" in the said emulsion.

2. Method according to claim 1 wherein said paths diverge by 90°.

3. Method according to claim 2, which comprises reflecting each of said light paths diverging by 90° by directing each light beam against a reflecting surface from opposite directions to the same focal point.

4. Method according to claim 1 which comprises conconverging said reflected light from opposite directions through said common focal point.

5. Method according to claim 4, which comprises maintaining said film across said focal point transversely to the paths of the convergent light beams.

References Cited in the file of this patent

UNITED STATES PATENTS

| 1,222,925 | Brewster | Apr. 17, 1917 |
| 1,508,916 | Brewster | Sept. 16, 1924 |

OTHER REFERENCES

Textbook, "Photography Principles and Practice," by Neblette, 1927, pages 569 and 570.